United States Patent [19]

Baker

[11] Patent Number: 5,603,796
[45] Date of Patent: Feb. 18, 1997

[54] LASER CUTTING METHOD FOR MARKING TIRE APPLIQUES

[75] Inventor: Mary E. Baker, Shelbyville, Ind.

[73] Assignee: Tattoo Incorporated, Shelbyville, Ind.

[21] Appl. No.: 898,143

[22] Filed: Jun. 15, 1992

[51] Int. Cl.[6] ........................................ B32B 31/00
[52] U.S. Cl. .................... 156/272.8; 156/250; 156/268; 156/270; 156/272.2; 156/272.6; 156/277; 264/400
[58] Field of Search ...................... 156/253, 268, 156/269, 270, 272.2, 277, 272.6, 272.8; 264/248, 22; 428/295, 492, 495, 493

[56] References Cited

U.S. PATENT DOCUMENTS

| | | | |
|---|---|---|---|
| 1,371,501 | 3/1921 | McLane | 264/248 |
| 1,544,262 | 6/1925 | Midgley | 264/245 |
| 2,625,496 | 1/1953 | Swift et al. | 428/40 |
| 2,985,216 | 5/1961 | Williams et al. | 156/277 |
| 4,125,655 | 11/1978 | Kanzelberger | 156/235 |
| 4,256,159 | 3/1981 | Williams | 428/79 |
| 4,343,342 | 8/1982 | McDonald . | |
| 4,392,900 | 7/1983 | Helbing | 156/153 |
| 4,504,565 | 3/1985 | Baldvins et al. | 430/964 |
| 4,684,420 | 8/1987 | Bryant et al. . | |
| 5,005,949 | 4/1991 | Egawa et al. | 350/276 |

*Primary Examiner*—Merrick Dixon
*Attorney, Agent, or Firm*—Woodard, Emhardt, Naughton, Moriarty & McNett

[57] ABSTRACT

A method for marking a previously molded vehicle tire. The method involves the use of a laser beam to cut configurations in a laminated tire applique so that the margins of the configurations form the identifying indicia. The applique is secured to the tire by pressing onto the prepared surface of the tire so as to vulcanize the applique to the tire's surface.

5 Claims, 3 Drawing Sheets

LASER CUTTING METHOD FOR MARKING TIRE APPLIQUES

BACKGROUND OF THE INVENTION

1. Field of the Invention

The present invention relates generally to methods for applying identification markings to tire appliques and, in particular, to a laser cutting method therefor.

2. Description of the Prior Art

Tire manufacturers provide a serial number on each tire for identification purposes. As a role, however, the manufacturer's identification number, which may actually be a combination of numbers and letters, is rather small in size and not positioned well for viewing when the tire is mounted on a vehicle.

There are often situations where having only the manufacturer's serial number on a tire is insufficient, such as because of the relative difficulty in reading this serial number at a distance or at a glance. For example, ear rental agencies must be vigilant to protect against customers switching tires on rental cars while the cars are in the Gustomar's possession off the premises of the rental agency. To prevent such an ocurrance, the rental agency needs to make a quick and accurate identification of the tires on the rental vehicles when they are returned to the agency by the customer. In such a situation, it is desirable to have a tire identification marking which is readily accessible to viewing, easy to read, attractive and not readily removable from the tire.

In U.S. Pat. No. 2,988,216 there is disclosed a tire applique and method of application which involved cutting a multi-layered applique in a configuration or configurations which produced by the margins of the cuts the identifying indicia. In this method, the cutting step created windows or apertures in the applique, making visible the tire wall which contrasted in color with the surface of the applique. Although not particularly described in detail in this patent, the cutting method employed involved a die cutting procedure.

Because the amount and types of identifying material which could be employed were limited by the die cutting procedure, there was developed an improved tire applique and method for making same which employed a hot stamping process to stamp a color contrasting material into depressions made in the applique by the stamping die. This method is fully disclosed in U.S. Pat. No. 4,256,159.

Although both of the above methods offer certain advantages in the manufacture of tire appliques, they both also suffer restrictions in the types of identifying indicia which may be employed on the applique. For example, neither of the methods disclosed in the above-described patents is particularly well suited to generate bar coding information, change fonts, indicia sizes, or consecutively number indicia on successive appliques without changing dies.

The following patents disclose various methods for manufacturing tire appliques:

| U.S. Pat. No. | Inventor |
| --- | --- |
| 1,544,262 | Midgley |
| 4,343,342 | McDonald |
| 4,684,420 | Bryant et al. |

The '262 patent to Midgley discloses a method for marking tires in contrasting colors without requiring the application of a pigment. The method involves heating the tire in contact with a band which overlaps the meeting edges of the tread and sidewalls and which is composes of a metal capable of chemically reacting with the tire material to produce a change of shade in the tire surface.

The '342 patent to McDonald discloses a tire having debossed or embossed identification markings which are generated on the tire during the molding or vulcanization process.

The '420 patent to Bryant et al. discloses a transfer decal process of applying identification markings on a vehicle tire. In this method, a polymeric paint or film is applied to selected portions of a release substrate to form a decal which is in turn placed into a tire mold. The mold is then closed and the polymeric paint is brought into contact with the tire.

SUMMARY OF THE INVENTION

A method for marking a tire, according to one embodiment of the present invention is accomplished by providing an applique comprised of a laminate material including at least two layers, the first layer comprising an elastomeric material adapted for securement to a tire surface and the second layer comprising a material to be cut. The applique is marked with the identifying indicia by cutting at least the second layer of the laminate material with a laser beam so that the cut margins of the second layer form the configuration of the identifying indicia. The tire surface is then buffed and a suitable solvent is applied to the buffed tire surface. The applique is then secured to the tire by pressing the first layer of the laminate material onto the prepared surface of the tire.

It is an object of the present invention to provide an improved method for marking a tire.

It is a further object of the present invention to provide a method for marking a tire which is capable of marking indicia in a variety of fonts, sizes as well as types, such as bar coding, logos, etc.

Related objects and advantages will become more apparent by reference to the following drawing figures and detailed description.

DESCRIPTION OF THE PREFERRED EMBODIMENT

Figure 1:
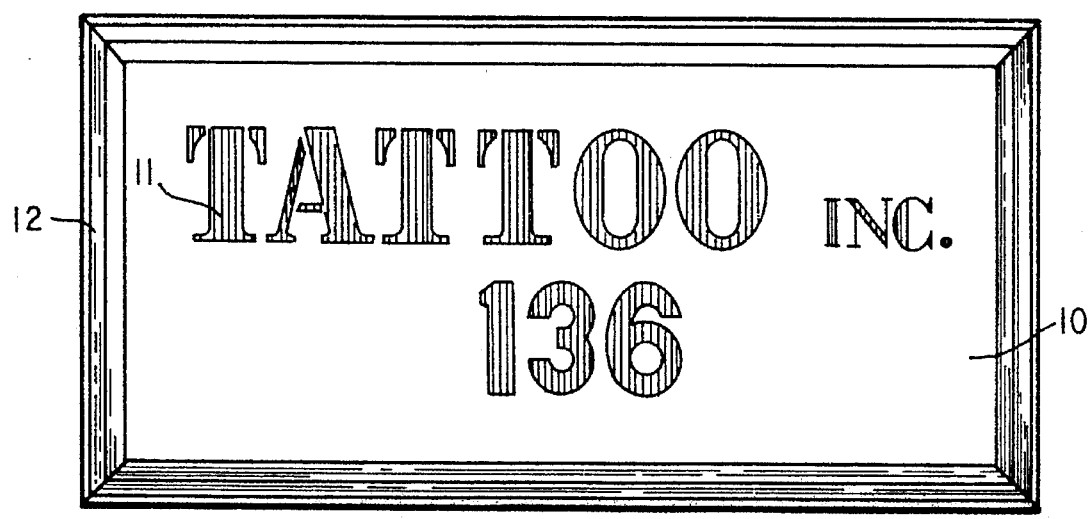
FIG. 1 is a top, plan view of a tire applique constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 shows a tire applique 10 constructed in accordance with the method of the present invention. The applique 10 has indicia 11 thereon including a series of numbers and letters, although it should be understood that a wide range of other identifying indicia could be used including bar coding information, logos, etc. The applique 10 preferably has its margins 12 bevelled to minimize the possibility of the applique being scuffed from the tire surface, such as might otherwise occur when the tire brushes a curb.

Figure 2:
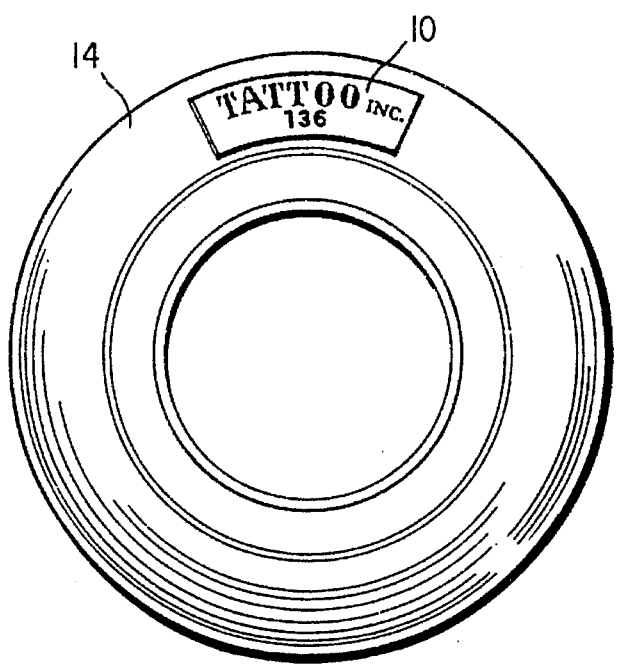
FIG. 2 is a side, elevational view of a tire having mounted thereon a tire applique according to the method of the present invention.

As may be seen in FIG. 2, the applique 10 may be applied at any desirable location on the tire 14, although for easy viewing purposes this will usually be on the curb side of the sidewall of tire 14. Further, the applique 10 may be applied either before or after the tire 14 is mounted to a vehicle.

Figure 3:
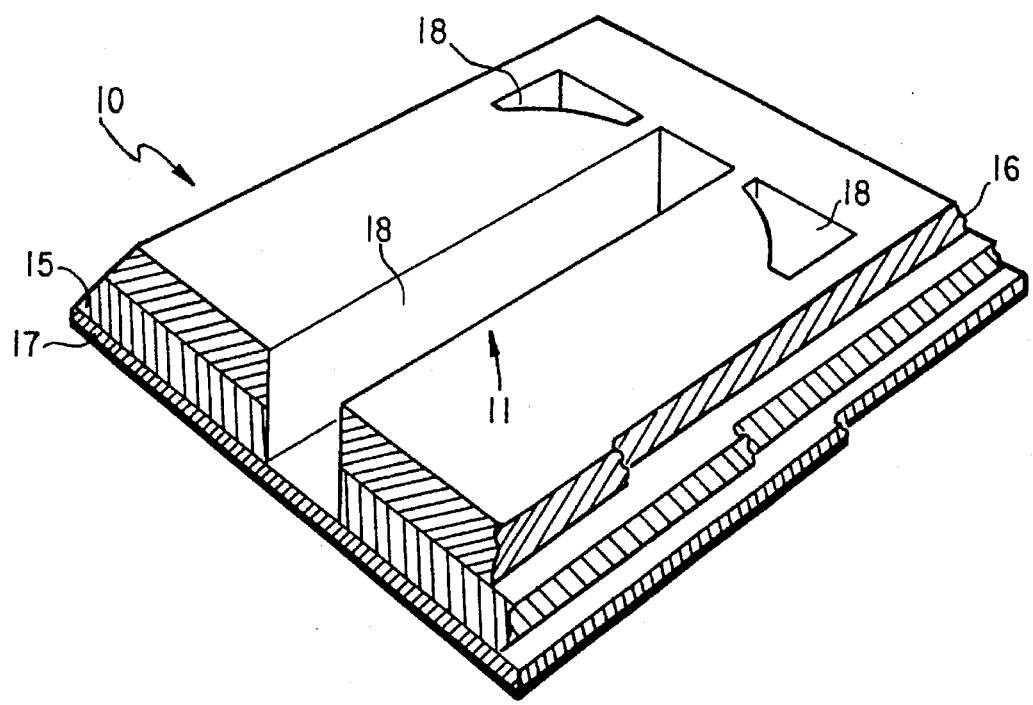
FIG. 3 is a perspective, cross-sectional view of a portion of the tire applique of FIG. 1.

Referring now to FIG. 3, details of the preferred laminated construction of the applique 10 are shown. The first layer 15 is comprised of an elastomeric material which is suitably adapted for securement to a tire surface. Preferably, layer 15 is a rubber latex material which is vulcanizable under atmospheric temperatures, such as cushioned gum rubber. This permits the applique 10 to be vulcanized to the tire 14 upon securement, thereby becoming an integral part of the tire which cannot be readily removed in an unauthorized manner without leaving observable removal markings. The second layer 16 of the applique is preferably comprised of a vulcanizable elastomeric material such as such as natural or synthetic rubber. For easy visiblity, the layer 16 is preferably provided in a color which contrasts with the color of the mounting surface on tire 14. It should be noted that additional color contrasting layers similar to layer 16 may also be provided where multi-colored identifying indicia are desired.

A third layer 17 comprising a removable backing layer is peelably secured to the first layer 15. Backing layer 17 serves to protect the first layer 15 from becoming contaminated with dirt, grime, etc. prior to being secured to the tire 14. Preferably, backing layer 17 may be of Holland cloth or other suitable fabric or low-stick plastic material.

Indicia 11 are formed by a series of depressions 18 in the applique, the margins of the depressions being generated by cutting of one or more layers of the applique.

Figure 4:
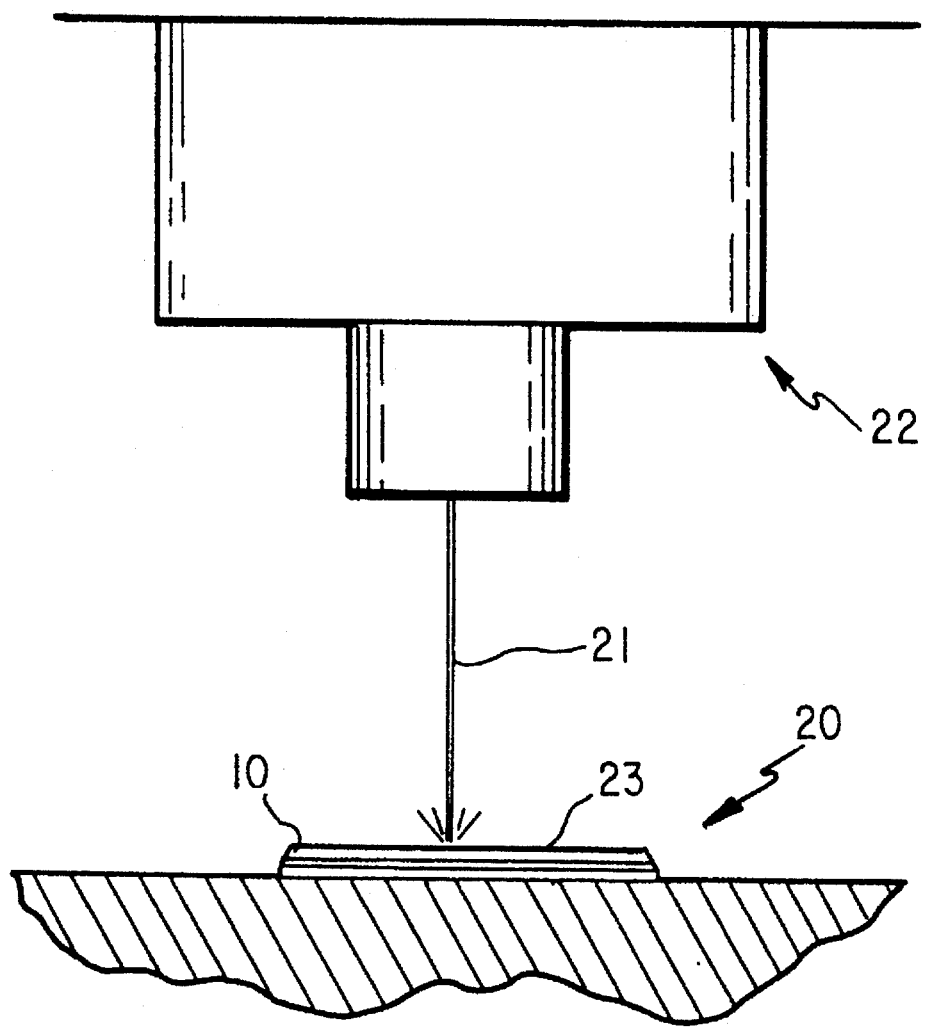
FIG. 4 is a schematic view illustrating the laser marking step of the present invention.

Referring to FIG. 4, the steps employed to generate the marking indicia on the applique 10 will now be described. The applique 10 without indicia thereon is conveyed to a work station 20 where the applique 10 is maintained in a stationary position while a laser cutting beam 21 targeted from laser marking apparatus 22 moves across the surface 23 of applique 10. The beam 21 is steered through the final focusing optics, located within the housing of apparatus 22, by a pair of low mass steering mirrors rotated by servo motors which are in turn controlled by a high speed microprocessor. As the focused beam 21 is steered across the applique 10, it heats, melts and/or vaporizes the applique material, depending upon the laser wavelength and power setting.

Figure 5:
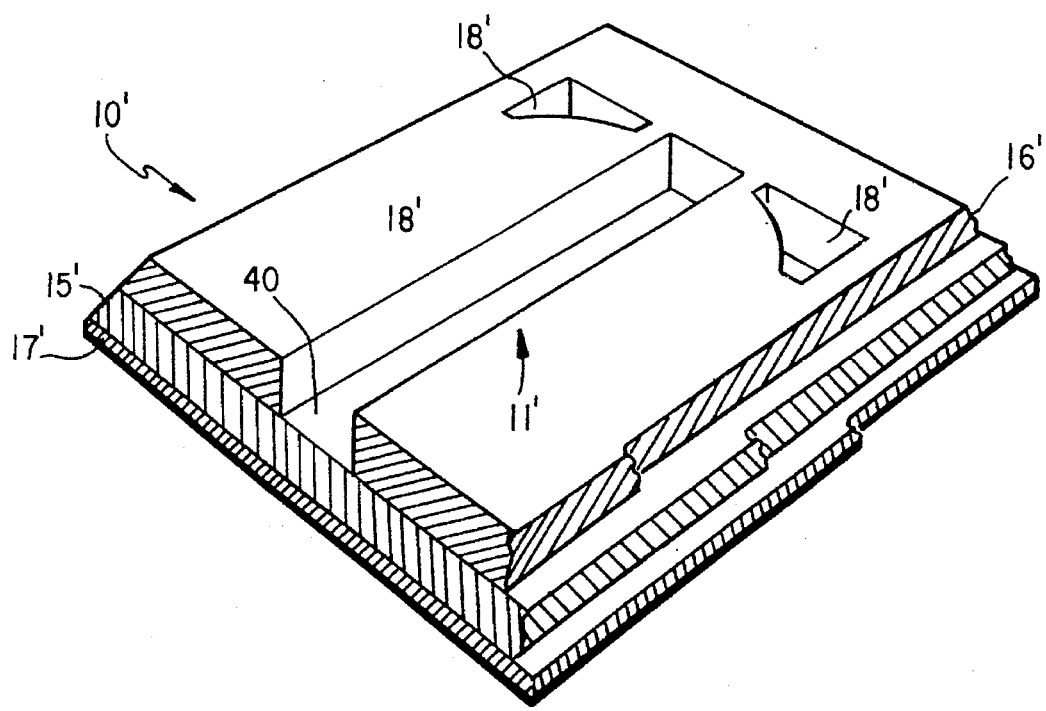
FIG. 5 is a perspective, cross-sectional view of a portion of an alternative embodiment of the tire applique of FIG. 1.

The width of beam 21 determines the width of the cut. The depth of the cut may be desirably controlled so as to cut entirely or partially through the applique 10. Variable adjustment of the power setting and cycle time permits varying of the depth of the cut. In FIG. 3, the depth of the laser beam cut is entirely through the first layer 15 and second layer 16 so that apertures or windows are created through the applique 10 and the sidewall surface of tire 14 is visible therethrough. Alternatively, as depicted in the alternative applique embodiment 10' in FIG. 5, the depth of the laser beam cut may be through the second layer 16' only, so that the surface 40 of first layer 15' is visible within the margin of the cut. In the applique 10' of FIG. 5, the second layer 16' has a color which contrasts with the color of the first layer 15'.

Laser marking systems are conventionally known, however, a preferred such apparatus for use with the method of the present invention is a 10 watt $CO_2$ type or larger laser marking system.

The following exemplary test results were obtained by marking identifying indicia on sample appliques employing a $CO_2$ type laser marking system:

TEST RESULTS

| Sample Indicia | Power Setting | Beam Velocity Setting | Cycle Time (sec.) |
| --- | --- | --- | --- |
| 0123456789 A | 3800 | 45 | 4.6 |
| 0123456789 B | 3800 | 60 | 3.7 |
| 0123456789 C | 3800 | 100 | 2.5 |
| GSC-2A-325DT | 3800 | 60 | 2.55 |
| GSC-2A-325DT | 3800 | 60 | 2.55 |

The method for marking a tire 14 with an applique 10 is described as follows. An area on the exterior facing surface of the tire sidewall slightly larger than the size of the applique is first cleaned with a suitable cleaner solvent. After the area is allowed to dry, the area is buffed using a buffer wheel to remove any loose particles. An application brush is then used to apply a self-vulcanizing fluid adhesive to the cleaned tire area. The fluid adhesive is then allowed to dry. Once dry, the backing layer 17 on applique 10 is removed and the applique is placed onto the prepared tire surface. The surface of layer 16 of applique 10 is then pressed into intimate contact with the prepared surface of tire 14 in such a way as to permanently affix the applique thereto. In order to facilitate application of pressure on the applique a roller tool is preferably employed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for marking a tire, comprising the steps of;
    a. providing an applique comprised of a laminate material including at least two layers, the first layer comprising an elastomeric material adapted for securement to a tire surface and the second layer comprising a substantially elastomeric material to be cut;
    b. marking the applique by cutting at least the second layer of the lamninate material with a laser beam so that the cut margins of the second layer form the configuration of the identifying indicia; and
    c. affixing the applique to the surface or the tire at a desired location.

2. The method of claim 1 wherein step a. further comprises providing the laminate material with a third layer secured to the first layer, the third layer being a backing layer which is removable from the first layer.

3. The method of claim 1 wherein laser marking step b. includes cutting only partially through the laminate material with the laser beam.

4. The method of claim 1 wherein the laser cutting step b. is performed by moving a laser beam across the applique while the applique is stationary positioned on a work surface.

5. The method of claim 4 wherein the laser beam is provided by a 10 watt power $CO_2$ type marking laser.

* * * * *